United States Patent [19]
Lemons

[11] Patent Number: 5,398,445
[45] Date of Patent: Mar. 21, 1995

[54] TURF WETTING DEVICE

[76] Inventor: Jerry L. Lemons, 101 Oak Hollow, Hermitage, Tenn. 37076

[21] Appl. No.: 40,329

[22] Filed: Mar. 30, 1993

[51] Int. Cl.⁶ .......................................... A01G 29/00
[52] U.S. Cl. ....................................................... 47/48.5
[58] Field of Search ......................................... 47/48.5

[56] References Cited

U.S. PATENT DOCUMENTS

| | | | |
|---|---|---|---|
| 2,850,992 | 9/1958 | Hooper et al. | 47/48.5 |
| 2,902,953 | 9/1959 | Young | 47/48.5 |
| 3,026,827 | 3/1962 | Cunningham | 47/48.5 |
| 3,762,171 | 10/1973 | Bjorheim et al. | 47/48.5 |
| 4,170,948 | 10/1979 | Strickland, Jr. | 47/48.5 |
| 5,050,340 | 9/1991 | Seifert | 47/48.5 |

Primary Examiner—Ramon S. Britts
Assistant Examiner—Joanne C. Downs
Attorney, Agent, or Firm—Waddey & Patterson

[57] ABSTRACT

A turf wetting device has a handle which receives water from a hose. The handle is connected to a base by a stem. The stem directs water from the handle into the base. The base then collects the water and directs the water through plural probes which are directed into the ground. The user can stand on the base to prevent bulging of the wetted soil. The probes consist of a central probe and preferably four outer probes proximate to the corners of the base which direct water in two directions.

6 Claims, 3 Drawing Sheets

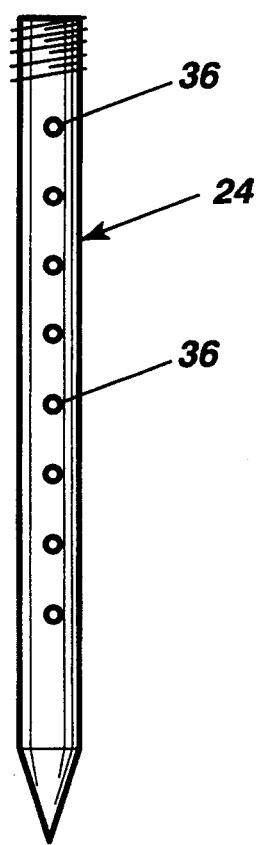
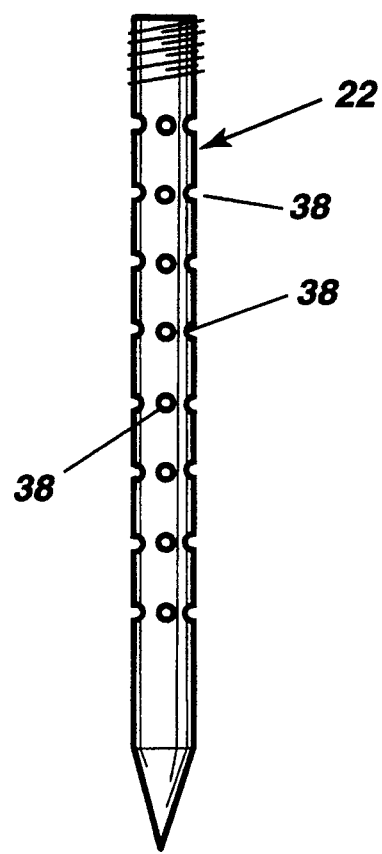
FIG. 3     FIG. 4

TURF WETTING DEVICE

BACKGROUND OF THE INVENTION

The present invention relates generally to lawn and turf care devices and more particularly to a device for applying water directly to a dry spot on a golf course green.

It will be appreciated by those skilled in the art that golf courses often develop isolated "hot spots" or dry spots in the turf which tend to be hydrophobic. It will further be appreciated by those skilled in the art that the appeal of a golf course is often its aesthetic value from which dry spots detract. To this end, there have been several attempts to overcome the problem of dry spots.

The original and most common attempt to "cure" a dry spot in golf course turf is to apply water at the surface from a hose, thereby saturating the area. Unfortunately, this method can cause a flooded or saturated condition both above and below the surface (with the dry spot remaining dry) that must be avoided by golfers. This method is also expensive and time consuming because only a fraction of the water leaving the hose actually penetrates the target area, and it must soak down through the turf to get there. Control of the water delivered in this manner is poor, and an unnecessarily large area tends to become saturated, again with the dry spot unaffected.

Some golf course superintendents have tried to penetrate the dry spot with a single pipe and apply water through the pipe, such as might be used when feeding the roots of a tree. A problem with this method is that these pipes direct water into the ground at a single point and at high pressure, usually thirty (30) or more pounds per square inch. Thus, this device frequently allows surface bulging as well as disturbance and de-stabilization of the soil while directing water to only one spot.

Other attempts at dealing with the problem of turf dry spots have included applying wetting agents. Unfortunately, the wetting agents tend to be expensive and ineffective.

What is needed, then, is a device for rapidly and efficiently applying water directly to a dry spot at low pressure so as not to disturb the soil or raise the turf. This device is presently lacking in the prior art.

SUMMARY OF THE INVENTION

The present invention discloses a device for applying water directly to a dry spot. The device has a handle which receives water from a hose. The handle is connected to a base by a stem. The stem directs water from the handle into a water reservoir within the base. The base then collects the water and directs it through plural hollow probes extending vertically downward from the bottom of the base and which penetrate the soil beneath the surface of the turf. The user can stand on the base to prevent bulging of the wetted soil. The probes consist of, in the preferred embodiment, a hollow rod mounted substantially in the center of the base and having multiple orifices which direct water laterally in four directions and at least one and preferably four outer probes, also hollow, proximate to the corners of the base which direct water laterally in two directions.

Accordingly, one object of the present invention is to provide a device which applies or injects water directly into a dry spot in golf course or other turf.

Another object of the present invention is to provide a dry spot wetting device which can be used without raising the surface of the soil.

Still another object of the present invention is to provide a device which directs water at low pressure beneath the surface so as not to disturb the soil.

A further object of the present invention is to provide a device which does not waste water or cause surface flooding.

BRIEF DESCRIPTION OF THE DRAWINGS

FIG. 3 is a front view of an outer probe of the present invention.

FIG. 4 is a front view of the central probe of the present invention.

DESCRIPTION OF THE PREFERRED EMBODIMENT

Figure 1:
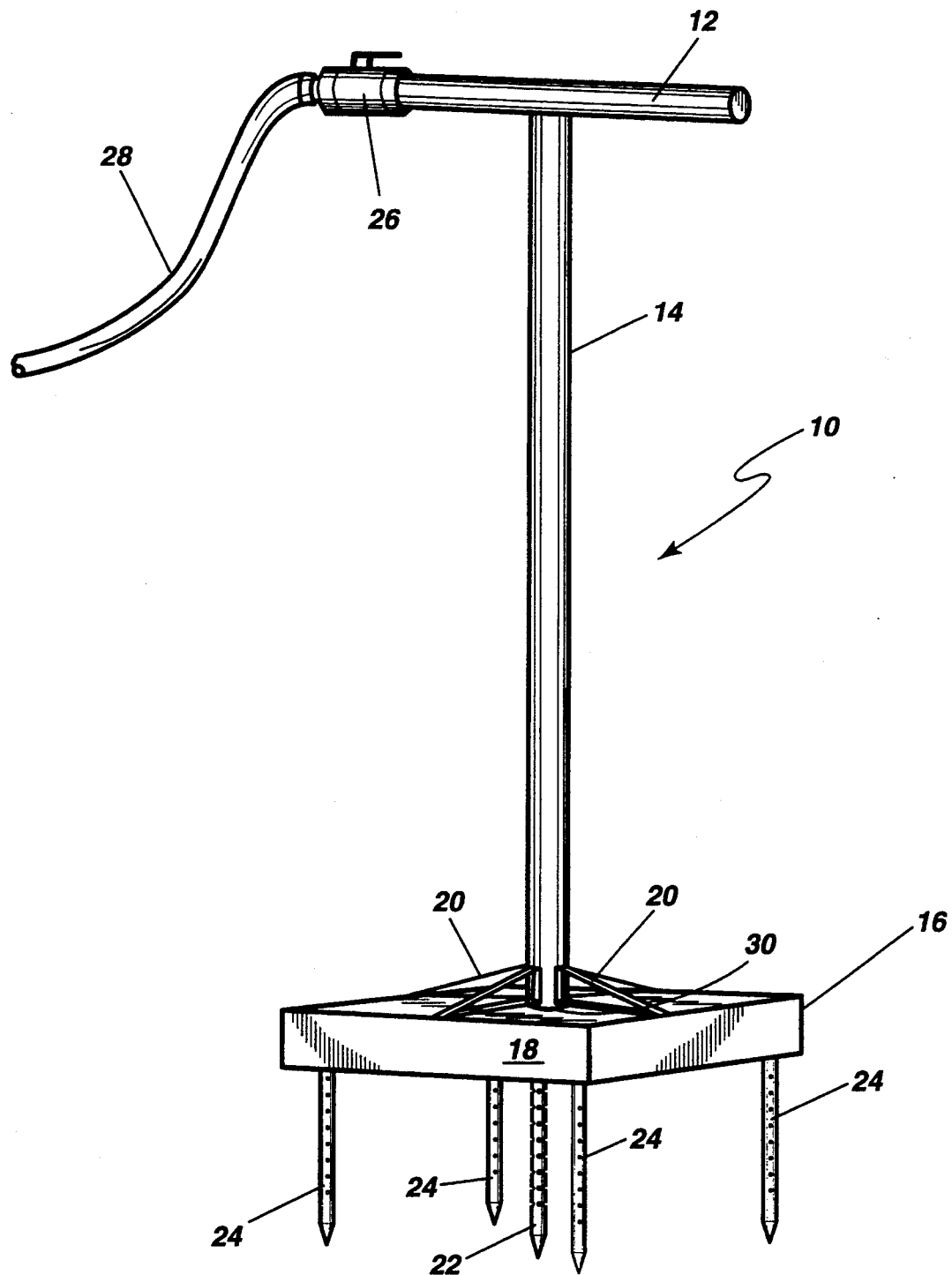
FIG. 1 is a front view of the turf wetting device of the present invention.
Figure 2:
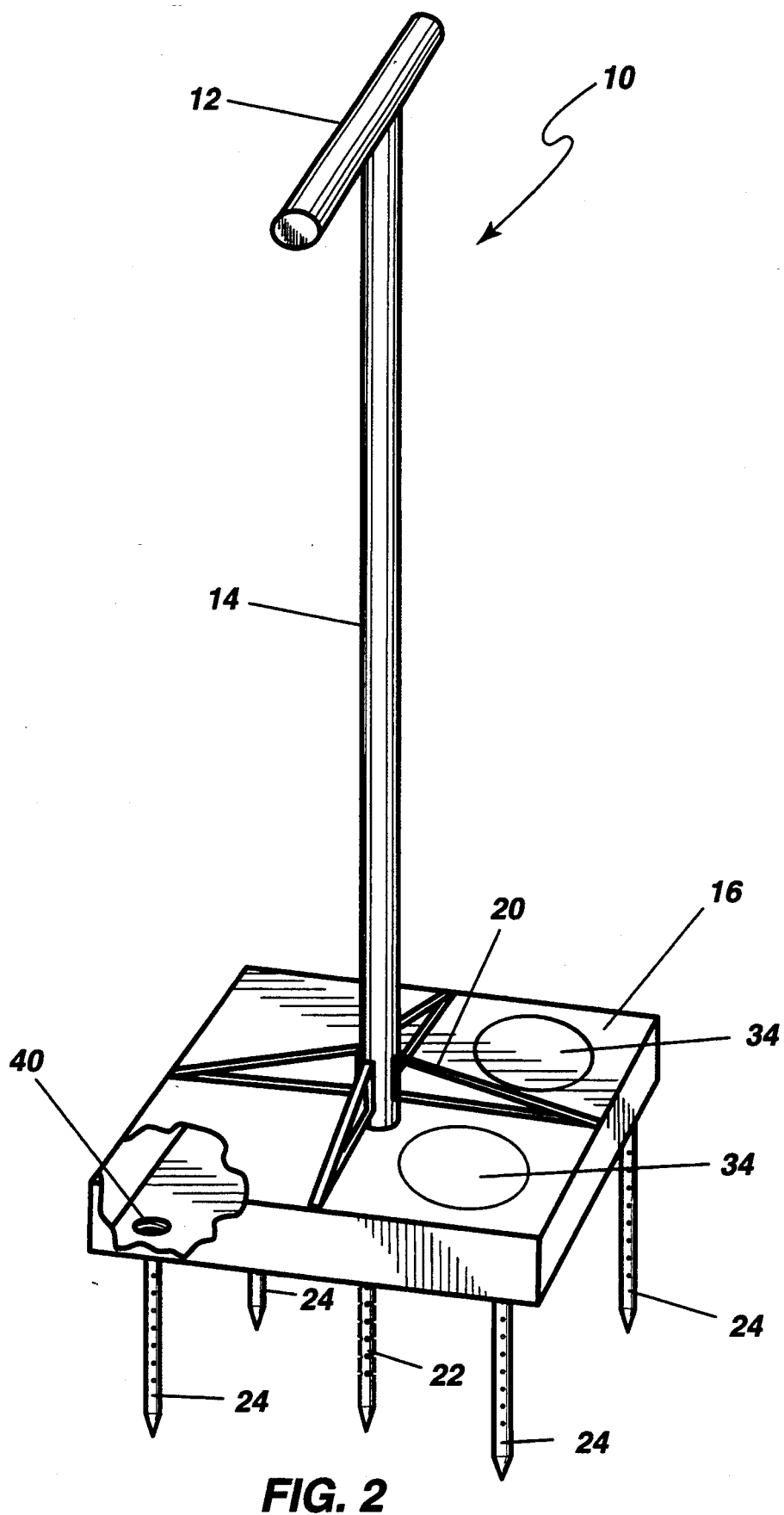
FIG. 2 is a perspective view of the turf wetting device of the present invention looking from the side.

Referring now to FIG. 1, there is shown generally at 10 the turf wetting device used for applying water to a dry spot. Device 10 generally includes a handle 12 mounted at fight angles to a stem 14 which extends vertically downward and is connected at stem opening 30 to base 16 by supporting members 20. Handle 12, preferably made of a lightweight tubular metal such as aluminum, has a hollow internal horizontal chamber which communicates with a corresponding hollow vertical chamber in stem 14. One end of handle 12 is solid or capped to prevent the egress of water. The other end is attached to a valved fitting 26 which is adapted to receive and regulate water flow from a standard 1" hose. Optionally, fitting 26 can include a conventional internally threaded adaptor to allow for the connection of a ¾" hose fitting. Also, a flow control valve can be mounted within stem 14.

Rectangular base 16, preferably made of ¼" aluminum, is also hollow, having an internal reservoir 18 to receive water which is delivered through handle 12 and stem 14. Extending vertically from the bottom surface of base 16 are multiple water injector probes, preferably a centrally mounted probe 22, and four outer probes 24 proximate to the edges and/or corners of base 16.

Looking now at FIGS. 3 and 4, probes 22 and 24 are preferably hollow rods machined from stainless steel or other rigid and corrosion resistant material, and have a general cylindrical shape of approximately ⅜" outside diameter. Central injector probe 22 will have four vertical columns of multiple aligned water orifices 38, with each column spaced at 90 degree intervals around probe 22 so that water will be injected in a full 360 degree pattern beneath base 16. Outer injector probes 24 will preferably have two 180 degree opposed columns of multiple orifices 36, oriented so that orifices 36 are directed in a line parallel to the edges of base 16. The upper ends of each of probes 22, 24 are externally threaded to allow for easy attachment to internally threaded probe openings 40 in the underside of base 16. The bottom ends of probes 22, 24 are pointed to facilitate penetration of the soil. The length of probes 22, 24 can be varied depending on the depth of the dry spot but it is known that a length of approximately 6¼" will treat most affected areas.

To operate wetting device 10 after a turf dry spot is located, a conventional irrigation hose 28 is connected to valved fitting 26 with the valve in the closed position. Base 16 of device 10 is then positioned directly over the center of the dry spot. The user grasps handle 12 and stands at foot locations 34 on the top surface of base 16, thereby driving injector probes 22 and 24 directly into the affected area in a vertical orientation. Valved fitting 26 is then opened, allowing water to flow through handle 12, stem 14, reservoir 18, probes 22 and 24, and out into the dry subsurface soil through orifices 36 and 38. The user will remain standing on base 16 to inhibit any tendency of the soil to rise or bulge in response to the injection of water below. Further adjustment can be made of the flow rate by manipulation of valved fitting 26. In typical golf course irrigation systems which operate at 80–110 PSI, a ten second injection cycle is usually sufficient to produce the desired wetting effect. Valved fitting 26 can then be closed and device 10 removed and relocated to another dry spot if needed.

To minimize the risk of subsurface soil disturbance and bulging of the turf surface, it is important that injected water exit orifices 36 and 38 at low pressure. One easy way of controlling this while maintaining a high flow rate is to be sure that the size and number of orifices 36 and 38 permit water to flow out at a rate that exceeds the rate of flow through stem 14 and into reservoir 18. There are a number of different combinations of component dimensions and configurations that will accomplish this. In one preferred embodiment, if central probe 22 and outer probes 24 have five orifices 38 or 36 in each column, and if probes 22 and 24 have inside diameters of approximately ¼", then low pressure injection is achieved quite easily. In such embodiment, orifices 36, 38 will have diameters of approximately 3/32" and be equally spaced at 1" intervals along probes 22 and 24. Base 16 will be approximately 12" square, with an inside reservoir 18 depth of approximately 1".

Thus, although there have been described particular embodiments of the present invention of a new and useful turf wetting device, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A turf wetting device comprising:
   a. a handle;
   b. a base attached to said handle by a stem;
   c. reservoir means for collecting water internal to said base;
   d. plural water injector probes attached to and extending vertically below said base and communicating with said reservoir means;
   e. means for delivering water to said reservoir means; and
   f. said reservoir means having an interior cross-sectional area in the direction of flow of water which is greater than the interior cross-sectional area of said means for delivering water to said reservoir means.

2. The device of claim 1, said handle comprising means for receiving water from a hose, and said means for delivering water to said reservoir means comprises hollow chambers within said handle and said stem.

3. The device of claim 2, said probes comprising hollow rods having at least one orifice through the surface of said probes.

4. The device of claim 3, said plural probes further comprising a central probe attached at the approximate center of said base and at least four outer probes attached proximate the sides of said base.

5. The device of claim 3 wherein said base comprises foot support means to receive a users foot to force said plural probes into soil below the turf and to apply weight on the dry spot to inhibit bulging of the turf.

6. The device of claim 3 wherein said plural probes have a combined interior cross-sectional area in the direction of flow of water which is less than the interior cross-sectional area of said reservoir means and wherein said probe orifices have a combined cross-sectional area which is less than the interior cross-sectional area of said reservoir means.

* * * * *